G. A. FAIR.
SASH CONTROLLED VENTILATING WINDOW OR DOOR.
APPLICATION FILED APR. 17, 1916.
Reissued May 30, 1916. 14,141.
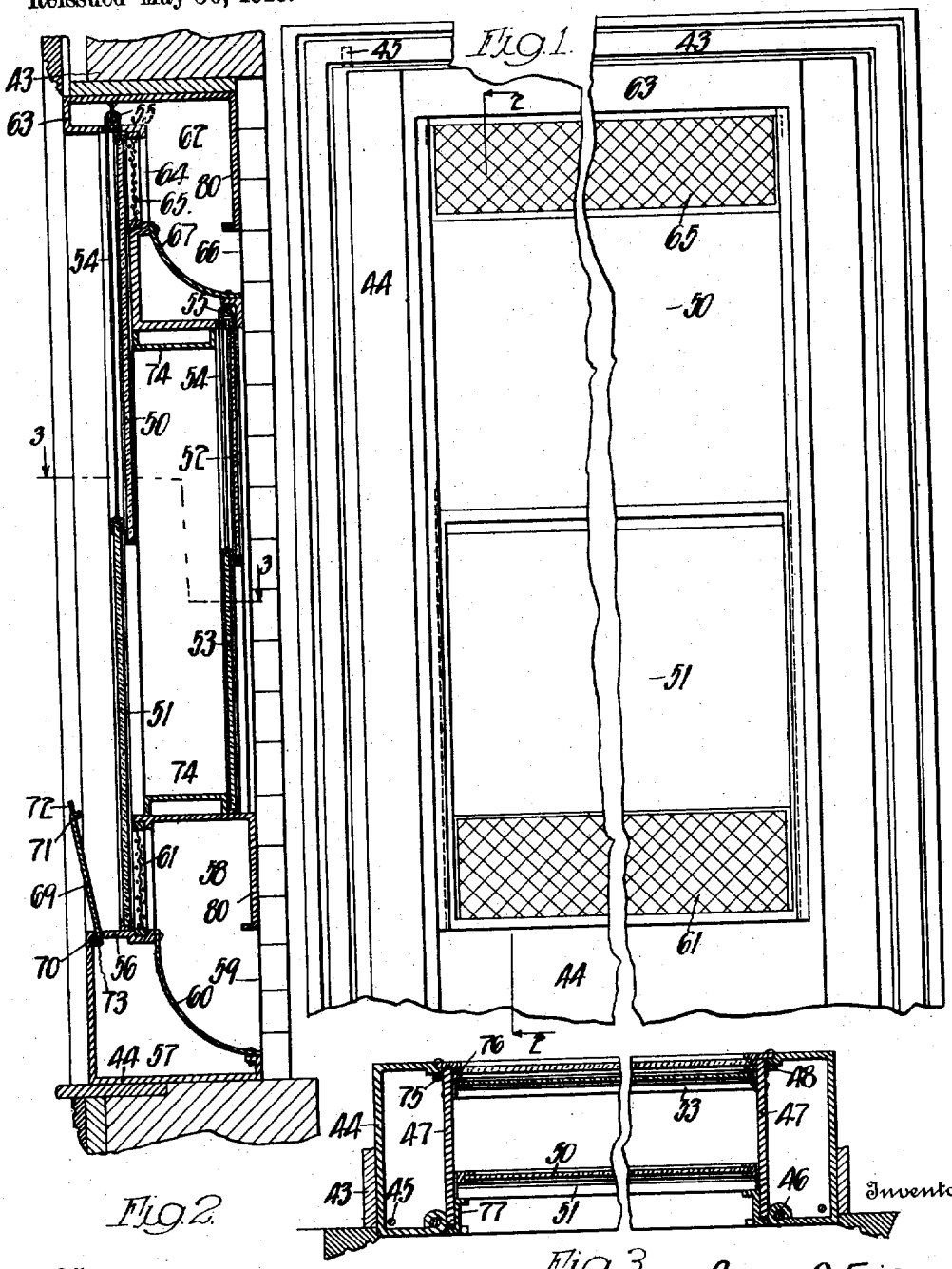
Witness
L. M. Patec.
Inventor
George A. Fair,
By
Pagelsen & Spencer
Attorneys

UNITED STATES PATENT OFFICE.

GEORGE A. FAIR, OF DETROIT, MICHIGAN, ASSIGNOR TO FAIR VENTILATOR-WINDOW COMPANY, OF DETROIT, MICHIGAN, A MICHIGAN COMPANY.

SASH-CONTROLLED VENTILATING WINDOW OR DOOR.

14,141. Specification of Reissued Letters Patent. Reissued May 30, 1916.

Original No. 1,136,785, dated April 20, 1915, Serial No. 841,108. Application for reissue filed April 17, 1916. Serial No. 91,815.

*To all whom it may concern:*

Be it known that I, GEORGE A. FAIR, a citizen of the United States, and a resident of Detroit, in the county of Wayne and State of Michigan, have invented a new and useful Sash-Controlled Ventilating Window or Door, of which the following is a specification.

My invention relates to windows and particularly to windows so constructed as to provide for a proper ventilation of the apartment in which the windows are used.

The primary object of my invention is the provision of means whereby the inlet of fresh air or the outlet of vitiated air into a room or apartment may be readily regulated, the construction being such that direct drafts are prevented.

A further object of the invention is the provision of a window so constructed that outer and inner sashes may be used to inclose a dead air space between them, and the inner pair of sashes may be used for controlling the inlet of fresh air and the outlet of vitiated air without losing the dead air space between the sashes.

A further object of the invention is the provision of a window of very simple construction in which ventilation may be readily controlled and in which dead air space is provided between the outer and inner sashes so that the window may be used under a large variety of climatic conditions so as to either secure a maximum of fresh air, as in summer, or secure the inlet of as small an amount of fresh air as required and the independent outlet of the vitiated air.

Other objects will appear in the course of the following description.

My invention is illustrated in the accompanying drawings wherein:

Figure 1 is a front elevation of my improved ventilating window construction. Fig. 2 is a vertical section through the window on the line 2—2 of Fig. 1. Fig. 3 is a cross section on the line 3—3 of Fig. 2.

Corresponding and like parts are referred to in the following description and indicated in all the views of the accompanying drawings by the same reference characters.

Referring to the drawings, 43 designates the window frame within which is pivoted a sash frame 44, this sash frame being pivoted in any suitable manner as by means of the pivot pins 45 so that the entire sash may be opened out. As illustrated in Fig. 3, the outside wall of each vertical bar of the sash frame is rectangular in shape and is hinged at 46 to the inside wall 47. The two sections of the sash frame are held in closed position by means of bolts 48 or other suitable devices.

The window illustrated is provided with a pair of inner sashes designated 50 and 51 respectively, and a pair of outer sashes designated 52 and 53 respectively. These sashes are mounted to slide between the inner walls 47 of the vertical bars of the window frame in any suitable manner and have the usual sash cords 54 passing over pulleys 55. Preferably one sash of each pair of sashes counterbalances the other sash of the same pair and thus when the lower sash of one pair is forced upward the upper sash of the same pair will lower, and vice versa.

The sill of the sash frame is designated 56 and forms the top of a transversely extending hollow casing 57 which extends entirely across the window and forms the lower bar thereof. This lower hollow bar or casing 57 at its outer portion extends above the sill 56 so as to form a ventilation box 58. The outside face of the hollow bar 57 is formed with an air inlet opening 59 and an inner wall 60 deflects the air entering through this opening into the ventilation box 58. The inner wall of the ventilation box is formed by a screen 61. It will be seen that the lower sash 51 of the inner pair of sashes when closed rests upon the sill 56 but that when the lower sash 51 is raised sufficiently, the upper sash will lower so as to rest upon the upper wall of the ventilation box 58. It will likewise be seen that in the lowered position the sash 51 when resting upon the sill 56 will close the opening across which the screen 61 is disposed but that when the lower sash is raised air will be admitted from the ventilation box 58 into the room. The lintel of the sash frame is formed by a hollow casing 62 having a portion 63 at its upper end which overhangs the sill 56. The front of the casing 62 is formed below the overhanging portion 63 with the opening 64 screened by wire gauze 65. The outer face of the casing has an opening 66 for the admission of fresh air and fresh air is directed upward into the upper portion of the casing which forms a ventilator box by means of the deflector plate 67.

It will be noted that when the inner sashes are in their closed position the upper sash 50 will engage with the under wall of the overhanging portion 63 and will close the opening 64, but that when this upper sash is lowered this opening will be unclosed and fresh air will be admitted into the room. It will be seen then that by raising the lower sash the upper sash will be lowered, and thus air will be admitted through the screened opening 61 and the hot air will pass out through the upper opening 64 or fresh air may enter through this upper opening, just as circumstances dictate. The rear sashes operate between the upper wall of the ventilation box 58 and the lower wall of the box or casing 62 and preferably, one sash counterbalances the other. Ordinarily, during the winter months, the outer pair of sashes are not opened and the inner pair of sashes only opened to an extent which will inclose the openings 61 and 64. Thus the dead air space 68 between the inner and outer sashes is at all times preserved, thus preventing the warmth of the room from being dissipated and also preventing the moisture gathering upon the sashes.

It is a very important matter that the dead air space should be preserved through the cold months of the year, particularly in the cold climates, as by this method frost is kept off the windows. After the weather grows warmer, however, all the windows may be fully opened and the dead air space eliminated.

It will be observed that the outer plates 80 of the lintel 62 and ventilation box 58 extend downwardly to prevent rain from beating into the openings over which the screens 61 and 65 extend.

In order to prevent cold air from entering the room, at right angles to the plane of the windows, I preferably provide a deflector plate designated 69 and illustrated in Fig. 2. This deflector plate is disposed in a slot 70 formed in the sill 56 and at its upper end is flanged as at 71 so that it cannot drop down too far through this slot 70. It is also provided with a ring or other form of handle 72 whereby it may be pulled up. The lower extremity of the plate 69 is deflected as at 73 so that when the plate is pulled up to its full extent it may be tipped and will hold in place without the necessity of using any fastening device for the purpose.

Parting strips 74, are of course, disposed between the front and rear pairs of sashes, thus holding these front and rear parts of sashes separated. Preferably the window frame is reinforced by outer reinforcing members designated 75 forming channels 76 within which a shade may be disposed while the inner portion of the window casing is reinforced by the reinforcing members 77 (see Fig. 3) providing a channel within which a screen of wire gauze may slide. This form of window is particularly applicable for use in Pullman cars which in winter require a dead air space between the outer and inner sashes and in which there is a great deficiency in proper ventilation. It is, however, obvious that the invention is not necessarily limited to its use in Pullman cars but may be applied to the windows of houses and other buildings, with equally good results. It will, of course, be understood that the window is shown deeper in proportion than it actually will be, in order to show the parts distinctly.

While this form of the invention has been shown as applied to windows I wish it distinctly understood that it might also be applied to doors.

Of course, I do not wish to be limited to the details of construction shown in the figures, although I regard certain details as preferable, it being obvious that many changes might be made in the invention without departing from the spirit thereof, and that my invention may be applied to many different forms of windows, and may also be applied to doors as well as windows, it being obvious that the frame of the door would constitute in that case the frame of the window and that either sashes or panels could be used in place of the ordinary window sashes.

Inasmuch as the construction would be practical for doors as well as a hinged window, such as illustrated in the drawings, I have not felt it necessary to illustrate the application of my invention to a door, and I wish it understood that by the terms "sashes", I not only intend to include window sashes but also panels, such as would be found in a door construction.

Having thus described the invention, what is new is:

1. In a window, a frame having a hollow member formed with inwardly and outwardly extending openings, and a sash mounted in said frame and adapted in one position to extend across the hollow member and prevent the passage of air therethrough and adapted to be moved within certain limits to uncover the adjacent opening of the hollow member normally closed by the said sash, to regulate the passage of air through the hollow member without uncovering the window opening proper.

2. In a window, a frame having a hollow ventilating member at one end provided upon a vertical wall with an air opening, a sash closing the said frame upon one side and extending from the hollow ventilating member to the opposite end of the frame, and a sash arranged on the opposite side of the frame and spaced from the first-mentioned sash to normally maintain a dead-air space, and extending across the hollow ventilating member to close the air opening in the vertical wall thereof and move within certain limits to uncover said air opening more or less to regulate the degree of ventilation without disturbing the dead air space formed between the spaced sashes.

3. In a window, upper and lower transversely extending hollow ventilating members having air openings formed in their inner and outer vertical walls, a sash arranged at one side of the window between the hollow ventilating members without closing the openings in the adjacent walls of such members, and sliding sashes arranged upon the opposite side of the window and spaced from the first-mentioned sash to maintain a dead air space, each of the sliding sashes extending across the adjacent wall of a ventilating member to close the opening thereof and move within certain limits to uncover the opening more or less to regulate the degree of ventilation without disturbing the dead air space formed between the spaced sashes.

4. In a window of the character described, a window frame, including laterally disposed bars and transversely disposed upper and lower bars, the upper and lower bars being hollow, the lower portion of the lower bar projecting inward of the upper portion of said bar, and the upper portion of the upper bar projecting inward of the lower portion of said bar, the inner faces of said bars respectively, above and below said projecting portions being formed with air outlet openings and the outer faces of the bars being formed with air inlet openings, a pair of sashes sliding between said lateral bars in the space between the projecting portions of the upper and lower bars and bearing against the faces of said bars when closed, to thereby obstruct the openings on the inner walls of said bars, said sashes when shifted toward the middle of the window disclosing said openings to permit the inlet of fresh air and the outlet of vitiated air.

5. In a window of the character described, a window frame including laterally disposed bars, and transversely disposed upper and lower bars, the upper and lower bars being hollow, the lower portion of the lower bar projecting inward of the upper portion of said bar, and the upper portion of the upper bar projecting inward of the lower portion of said bar, the inner faces of said bars respectively, above and below said projecting portions being formed with air outlet openings and the outer faces of the bars being formed with air inlet openings, a pair of sashes sliding between said lateral bars in the space between the projecting portions of the upper and lower bars and bearing against the faces of said bars when closed, to thereby obstruct the openings on the inner walls of said bars, said faces when shifted toward the middle of the window disclosing said openings to permit the inlet of fresh air, and outlet of vitiated air and outer sashes disposed between the upper and lower bars and spaced from the inner sashes to thereby provide a dead air space between the sashes when the sashes are closed.

6. In a window of the character described, a sash frame having upper and lower hollow members formed with openings upon the outer and inner walls thereof, an outer sash disposed in the sash frame between said hollow members, and an inner pair of sashes disposed in the sash frame and normally closing the openings through the inner wall of the hollow members but shiftable to disclose said openings.

7. In a window of the character described, a pivoted sash frame including upper and lower hollow members, each of said hollow members having inlet openings upon the inner faces thereof and openings upon the outer faces thereof, an outer pair of sashes disposed between said upper and lower hollow members, flexible connections between said sashes whereby one sash will counterbalance the other, a pair of inner sashes disposed between said hollow members, flexible connections between said inner sashes whereby one shall counterbalance the other, said inner sashes when shifted to their fully closed positions closing the openings through the inner walls of the hollow members and when shifted away from their fully closed positions disclosing a greater or less area of said openings through the inner wall.

8. In a window of the character described, upper and lower hollow sash bars, each bar communicating with the air exterior of the window and each having an opening on its inside face, and a pair of sashes movable against the inside faces of said bars, said sashes being shiftable into position to entirely disclose said openings in the inner walls of the bars or shiftable to a position to entirely close said openings.

9. In a window of the character described, a frame comprising upper and lower transversely extending hollow members, each communicating with a source of fresh air and each having its inner wall formed with an opening, a pair of sliding sashes disposed upon the inner faces of said hollow members and shiftable into positions to close or open the said openings through the inner walls of the hollow members, the lower hollow member acting as a sill for the lower sash, and a deflector mounted upon said sill and extending upward and inward.

10. In a window, a frame having a window opening proper and an air passage adjacent thereto, a sash movable in said frame, said sash extending across said air passage to prevent the flow of air therethrough when in one position and being movable within certain limits to uncover the air passage to regulate the flow of air without uncovering the window opening proper.

11. In a window, a frame having a window opening proper and an air passage at different levels, a sash slidable vertically in said frame, said sash extending across said air passage to prevent the flow of air therethrough when in one position and when in another position allowing a flow of air through the passage without uncovering the window opening proper.

12. In a window, a frame having a window opening proper, said frame also having an air passage adjacent the window opening through which passage air may flow and through which rain is prevented from beating, a sash movable in said frame, said sash extending across said air passage to prevent the flow of air therethrough when in one position and being movable within certain limits to uncover the air passage to regulate the flow of air without uncovering the window opening proper.

13. In combination, a fixed frame, a window structure pivoted to swing horizontally thereon, said window structure having a window opening proper and an air passage adjacent thereto, a sash movable in said window structure, said sash extending across said air passage to prevent the flow of air therethrough when in one position and being movable within certain limits to uncover the air passage to regulate the flow of air without uncovering the window opening proper.

14. In combination, a fixed frame, a window structure pivoted to swing horizontally thereon, said window structure having a window opening proper and an air passage at different levels, a sash slidable vertically in said window structure, said sash extending across said air passage to prevent the flow of air therethrough when in one position and when in another position allowing a flow of air through the passage without uncovering the window opening proper.

15. In a window, a frame having a window opening proper and an air passage adjacent thereto, sash mechanism movable in said frame, said sash mechanism inclosing dead air across the window opening and including a portion which extends across said air passage to prevent the flow of air therethrough when in one position and when in another position allowing a flow of air through the passage without uncovering the window opening proper.

16. A window including a hollow sash bar having an air passage communicating with the air both exterior and interior to the window, and a sash movable in respect to said bar to regulate the flow of air through the passage.

17. A window including a hollow sash bar having an air passage communicating with the air both exterior and interior to the window, said sash bar also including means whereby rain is prevented from beating through the passage, and a sash movable in respect to said bar to regulate the flow of air through the passage.

18. A window construction comprising means for forming a window opening proper and an air passage adjacent thereto, sash means whereby a dead air space is determined across the window opening proper and whereby the free opening through the air passage is regulated without opening communication with the dead air space.

19. A window construction comprising a frame having a lower hollow transversely extending member communicating with a source of fresh air and having its inner wall formed with an opening, a slidable sash shiftable to close or open said opening, the hollow member acting as a sill for the sash, and a deflector mounted on said sill for directing the air current upwardly and inwardly.

20. A window construction comprising a frame having a lower hollow transversely extending member communicating with a source of fresh air and having its inner wall formed with an opening, a slidable sash shiftable to close or open said opening, the hollow member acting as a sill for the sash, and a deflector mounted on said sill for directing the air current upwardly and inwardly, said deflector being disposed inwardly from the sash.

21. A window construction comprising a frame having a lower hollow transversely extending member communicating with a source of fresh air and having its inner wall formed with an opening, a slidable sash shiftable to close or open said opening, the hollow member acting as a sill for the sash, a deflector mounted on said sill for directing the air current upwardly and inwardly, said deflector being disposed inwardly from the sash, said hollow member including means for preventing ingress of rain to the opening.

22. A window construction comprising means for forming a window opening proper and an air passage adjacent thereto, and a movable sash whereby the window opening proper is partly closed and whereby the free opening through the air passage is regulated.

23. In a window, a fixed frame, and a second frame pivoted to swing horizontally therein, said second frame forming a window opening proper and an air passage adjacent thereto, sash means carried by the second frame whereby a dead air space is determined across the window opening proper and whereby the free opening through the air passage is regulated without opening communication with the dead air space.

GEORGE A. FAIR.

Copies of this patent may be obtained for five cents each, by addressing the "Commissioner of Patents, Washington, D. C."